(12) United States Patent
Brodt et al.

(10) Patent No.: US 11,176,171 B2
(45) Date of Patent: *Nov. 16, 2021

(54) CONTROLLING A MULTI-DATABASE SYSTEM

(71) Applicant: International Business Machines Corporation, Armonk, NY (US)

(72) Inventors: Andreas Brodt, Gerlingen (DE); Einar Lueck, Filderstadt (DE); Daniel Martin, Stuttgart (DE); Sabine Perathoner-Tschaffler, Nufringen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/733,543

(22) Filed: Jan. 3, 2020

(65) Prior Publication Data

US 2020/0151195 A1 May 14, 2020

Related U.S. Application Data

(63) Continuation of application No. 15/533,880, filed as application No. PCT/IB2015/059318 on Dec. 3, 2015, now Pat. No. 10,552,451.

(30) Foreign Application Priority Data

Dec. 8, 2014 (GB) ...................................... 1421743

(51) Int. Cl.
*G06F 16/00* (2019.01)
*G06F 16/27* (2019.01)
*G06F 16/23* (2019.01)

(52) U.S. Cl.
CPC ........ *G06F 16/273* (2019.01); *G06F 16/2358* (2019.01)

(58) Field of Classification Search
None
See application file for complete search history.

(56) References Cited

U.S. PATENT DOCUMENTS 6,466,951 B1   10/2002   Birkler
8,244,686 B2    8/2012   Deshmukh
(Continued)

FOREIGN PATENT DOCUMENTS

CN     1701325 A    11/2005
CN   101187888 A     5/2008
(Continued)

OTHER PUBLICATIONS

Chinese Office Action Issued in Chinese Application No. 201580063474.3 dated Nov. 5, 2019; 6 Pages.
(Continued)

*Primary Examiner* — Bai D Vu
(74) *Attorney, Agent, or Firm* — Cantor Colburn LLP; Steven Bouknight

(57) ABSTRACT

A computer-implemented method for controlling a system is provided. The system includes a source database and a target database. The system can asynchronously replicate data changes of at least one part of the source database to the target database. This asynchronous replication includes evaluating, by a capture engine, a log of the source database for identifying any un-replicated data changes of the at least one part of the source database, transferring the identified data changes to an apply engine, and applying, by the apply engine, the transferred data changes to the target database.

16 Claims, 4 Drawing Sheets

(56) References Cited

U.S. PATENT DOCUMENTS

| 8,352,425 B2 | 1/2013 | Bourbonnais |
| 2008/0163222 A1 | 7/2008 | Bourbonnais et al. |
| 2013/0117235 A1 | 5/2013 | Schreter |
| 2013/0238556 A1 | 9/2013 | Mielenhausen |
| 2017/0322993 A1 | 11/2017 | Brodt et al. |

FOREIGN PATENT DOCUMENTS

| CN | 101266606 A | 9/2008 |
| CN | 101512527 A | 8/2009 |
| CN | 102081611 A | 6/2011 |
| CN | 102937955 A | 2/2013 |
| CN | 102955851 A | 3/2013 |
| CN | 103226502 A | 7/2013 |
| CN | 103793514 A | 5/2014 |
| CN | 103827865 A | 5/2014 |
| WO | 0048096 A1 | 8/2000 |
| WO | 2011067214 A2 | 6/2011 |

OTHER PUBLICATIONS

International Search Report Issued in International Application No. PCT/IB2015/059318 dated Mar. 14, 2016; 5 Pages.
List of IBM Patent or Patent Applications Treated as Related; Date Filed Jan. 3, 2020; 2 Pages.
United Kingdom Search Report Issued in United Kingdom Application No. GB1421743.4 dated Jun. 3, 2015; 5 Pages.
Written Opinion Issued in International Application No. PCT/IB2015/059318 dated Mar. 14, 2016; 5 Pages.

CONTROLLING A MULTI-DATABASE SYSTEM

DOMESTIC AND FOREIGN PRIORITY

This is a Continuation of U.S. application Ser. No. 15/533,880, filed Jun. 7, 2017, which is a U.S. National Stage of Application No. PCT/IB2015/059318, filed on Dec. 3, 2015. Priority is claimed from United Kingdom Patent Application No. 1421743.4, filed Dec. 8, 2014, the contents of which are incorporated by reference herein in its entirety.

BACKGROUND

The present invention relates to a system comprising a source database and a target database, and more specifically, to controlling said system and the loading of data.

Database replication is meanwhile used by many database management systems for replicating data changes made in one database, also known as "master" or "source" database, to one or more other "slave" or "target" databases. The replication may be performed in order to mirror data in the master database multiple times on multiple servers or to store data in the slave database in a different format than in the master database.

In addition or as an alternative to data replication facilities, snapshot technologies may be used for creating snapshots of one or more tables of the master database and for transferring said snapshots into a slave database, e.g. upon a system outage or restart.

While a load process is fast but comes at the expense of a large amount of data to be transferred, replication, in particular incremental replication approaches, cause less data traffic but may be slow due to a latency time caused e.g. by a capture process, by computational overhead associated with using a heterogeneous database architecture or by characteristics of the hardware underlying the replication process. Without additional safety measures, a combination of loading and replication approaches could easily result in data inconsistencies between the master database and the slave database and the safety measures may significantly reduce the speed of data transfer from the master to the slave database for bringing both database copies in sync.

SUMMARY

It is an objective of the present invention to provide for an improved computer-implemented method, computer program product and corresponding control system for controlling a system that comprises a source database and a target database as specified in the independent claims Embodiments of the invention are given in the dependent claims. Embodiments of the present invention can be freely combined with each other if they are not mutually exclusive.

In one aspect, the invention relates to a computer-implemented method for controlling a system which comprises a source database and a target database and which is configured to asynchronously replicate data changes of at least one part of the source database to the target database. The replication comprises evaluating, by a capture engine, a log of the source database for identifying the unreplicated data changes of the at least one part, transferring the identified data changes to an apply engine and applying, by the apply engine, the transferred data changes in the target database. The method comprises:

detecting a trigger event for initiating a loading of the complete data content of the at least one part to the target database;

in response to the trigger event and regardless of the number of log records the capture engine has not evaluated yet, triggering the apply engine to stop applying data changes of the at least one part in the target database;

in response to having stopped the applying the data changes of the at least one part, triggering an inserting of a start load signal into the log at a current head of log position;

in response to the insertion of the start load signal and regardless of the number of log records the capture engine has not evaluated yet, initializing the loading of the complete data content of the at least one part to the target database; during the loading, performing concurrent write statements on the at least one part of the source database is permitted;

after the loading has completed, triggering an inserting of an end load signal into the log at a current head of log position;

while the loading is performed, triggering the capture engine to store all write statements which are executed, according to the log, on the at least one part of the source database after the start load signal and before the end load signal in a queue;

after the loading has completed, triggering the apply engine to apply the write statements stored in the queue to the data content of the at least one part having been loaded completely into the target database, said applying comprising identifying and skipping all write statements whose resulting data changes were already transferred to the target database by the loading.

Said features may allow coordinate the asynchronous refresh and any load processes in a way that:

a) concurrent write statements on the at least one part of the source database is permitted; thus, the data content of the source database and also of the at least one part is allowed to be updated during the loading (in some embodiments, only the row that is currently read by the load process may be locked); A write statement may be, for example, an SQL INSERT, UPDATE or DELETE statement;

b) all data changes having been introduced into the source database while the load process is running, are correctly replicated to the target database (by means of the queue and the applying of the queued data changes that includes a check to prevent duplicate entries; such an "adaptive apply" strategy may be computationally more demanding than a simple load, but it is limited to a comparatively small number of data changes having been queued during a time period defined by the start and end load signals);

c) the loading process can start almost immediately after the trigger event, even in case of a high latency of the replication process, i.e., in case a large number of log records have not been evaluated by the capture engine at the moment of the trigger event.

Thus, embodiments of the invention allow to provide for all beneficial effects a), b) and c) at the same time. The asynchronous replication may be performed per default, having the advantage that only a small amount of data is transferred. In some situations, e.g. upon a request of a user who wants to perform an analysis on the target database based on current data, or in case of a system failure or a large latency time, the loading may be applied immediately without having to wait until the latency time has lapsed and the replication process has caught up and without introducing inconsistencies by the load process in combination with the replication process. The stopping of the applying of the data changes of the at least one part and the starting of the loading only after said applying process was stopped may ensure that data changes which were already transferred to the target database are not applied twice. Thus, the generation of duplicates and data inconsistencies in the target database may be avoided.

In a further beneficial aspect, embodiments of the invention may be tolerant to capture engine outages or interruptions during the load process. The reason is that the signals that are injected into the log stream are processed correctly as soon as replication (the capture engine) is started again.

According to embodiments, the method further comprises: in response to the trigger event, and before the inserting of the start load signal, invalidating all start load signals and end load signals having been inserted into the log in response to previous trigger events.

Invalidating previous signals may ensure that write statements between the start and end load signals of previous events are not queued. Thus, it is ensured that the queue does not comprise write operations of a previous trigger event which impose data changes which are already covered by the load process triggered by the current trigger event and which would have to be filtered out when applying the write statements of the queue on the target database. Thus, time and processing power may be saved.

According to embodiments, the method is implemented by a control module being operatively coupled to the controlled system, the controlled system comprising the source database and the target database.

According to embodiments, the method further comprises: in response to the trigger event, causing the control engine, the capture engine and the apply engine to agree upon an earliest possible moment in time when the applying of the data changes of the at least one part can be stopped in the target database. According to embodiments, the applying of the data changes of the at least one part is stopped by stopping the complete replication process of the at least one part. In this case, the agreeing on the earliest moment in time when the apply process for the at least one part can be stopped is implemented as agreeing on the earliest moment in time when the asynchronous replication of the at least one part can be stopped. The stopping of the applying of the data changes is implemented as stopping the asynchronous replication of the at least one part. The start load signal is inserted into the log at or after a log record that reflects said agreed-upon earliest possible moment. For example, in response to the request, the control module may call a state manager module. The state manager module, in response to being called, may trigger and coordinate the performing of the agreeing process. After the agreed-upon start load record was identified, after the applying of the data changes of the at least one part was stopped and after the start load signal was inserted in the log, the control module may initiate the execution of the loading of the at least one part.

This may be advantageous, as this agreement on the moment in time when the apply process or the replication of the at least one part can been stopped—and thus—when the loading can start—may ensure that the state and referential integrity of the target database is preserved in case the load process should fail. The apply engine is enabled to finish ongoing apply processes of complex transactions, and the capture agent may be enabled to stage and transfer all statements of a transaction that shall be replicated completely before the loading starts to provide for a consistent point of recovery in case the loading process should fail. Thus, the apply engine and the capture engine may complete any ongoing capture or apply processes for the at least one part before the start load signal is injected into the log. Delaying the injection of the start load signal until the control engine, the capture engine and the apply engine have agreed upon said earliest possible moment in time may prevent data inconsistencies caused by interrupting the replication immediately. This agreement process may also be referred to as "synchronization" of the control module, the apply engine and the capture engine.

According to embodiments, the control module or the state manager module may trigger to automatically resume the replication of the at least one part after the moment in time that is reflected by the end load signal. At least the capturing process of the replication may be resumed right after the insertion of the end load signal. Preferentially, all data changes having been captured by the resumed replication process are started being applied on the target database after all write statements of the queue have been applied on the target database.

According to embodiments, the method further comprises:
  in response to the trigger event, instructing the capture engine to stop evaluating the log for identifying unreplicated data changes of the at least one part; and
  delaying the inserting of the start load signal until a confirmation message is received, the confirmation message indicating that the evaluation of the log for identifying unreplicated data changes of the at least one part was stopped successfully.

This may prevent capturing data changes which are surely known to be transferred by the load process to follow. In addition, an interruption of an ongoing capture process for the at least one part is prohibited which could lead to data inconsistencies between the source and the target database.

In a further aspect, the invention relates to a computer program product for controlling a system, the system comprising a source database and a target database. The computer program product comprises a computer readable storage medium having program instructions embodied therewith. The program instructions are executable by a processor to cause the processor to execute the method according to any one of the embodiments of the method described herein.

In a further aspect, the invention relates to a control system operatively coupled to a system, the system comprising a source database and a target database and being configured such that data changes of at least one part of the source database are asynchronously replicated to the target database. The replication comprises evaluating, by a capture engine, a log of the source database for identifying the unreplicated data changes of the at least one part, transferring the identified data changes to an apply engine and applying, by the apply engine, the transferred data changes in the target database.

The control system comprises a control module, the control module being operatively coupled to a signal injection module and a loader module. The control module is configured for:
  detecting a trigger event for initiating a loading of the complete data content of the at least one part to the target database;
  in response to the trigger event and regardless of the number of log records the capture engine has not evaluated yet, triggering the apply engine to stop applying data changes of the at least one part in the target database;

in response to having stopped the applying of the data changes of the at least one part, triggering an inserting of a start load signal into the log at a current head of log position;

in response to the insertion of the start load signal and regardless of the number of log records the capture engine has not evaluated yet, initializing the loading of the complete data content of the at least one part to the target database, whereby during the loading, performing concurrent write statements on the at least one part of the source database is permitted;

after the loading has completed, triggering an inserting of an end load signal into the log at a current head of log position;

while the loading is performed, triggering the capture engine to store all write statements which are executed, according to the log, on the at least one part of the source database after the start load signal and before the end load signal in a queue;

after the loading has completed, triggering the apply engine to apply the write statements stored in the queue to the data content of the at least one part having been loaded completely into the target database, said applying comprising identifying and skipping all write statements whose resulting data changes were already transferred to the target database by the loading.

According to embodiments, the control system comprises the loader module.

According to some embodiments, the loader module is a generic loader module, the generic loader module using a "SELECT *" command for retrieving the complete data content of the at least one part of the source database in a single operation. A 'generic loader module' as used herein is any loader module that uses the SELECT * syntax for extracting the data from the source database that shall be loaded into the target database. The "SELECT *" command can be interpreted and executed by any kind of database management system that supports SQL queries. For example, the generic loader module may be an internal module of a replication framework, i.e., of an IT-environment that is responsible for performing the asynchronous replication. For example, the replication framework may comprise the capture engine and the apply engine and the generic loader module. Using a generic loader module may have the advantage that the method according to embodiments of the invention can be implemented easily in existing distributed database systems and replication frameworks without specialized additional loader components.

According to other embodiments, the loader module is a source-database-type specific module which interfaces with a database management system (DBMS) that operates the source database. The source-database-type specific module is configured for using techniques provided by said DBMS for creating a copy of the at least one part, the copy being loaded during the loading to the target database. For example, the loader module may be the UNLOAD utility of DB2 for z/OS. The loader module may be external to the replication framework and may be optimized for efficient loading processes from one or more complete tables of a source database to a target database.

According to embodiments, the control system further comprises the signal injection module. In addition, or alternatively, the control system comprises a state management module. The control module is configured to call the state management module in response to the trigger event. The state management module is configured to cause, in response to being called, the capture engine and the apply ending to agree upon an earliest possible moment in time when the applying of changes on the at least one part can be stopped. The start load signal is inserted into the log at or after a log record that reflects the earliest possible moment when the applying of the data changes of the at least one part can be stopped. Instead of the apply process, the whole replication process may be stopped for the at least one part.

DETAILED DESCRIPTION

Figure 1:
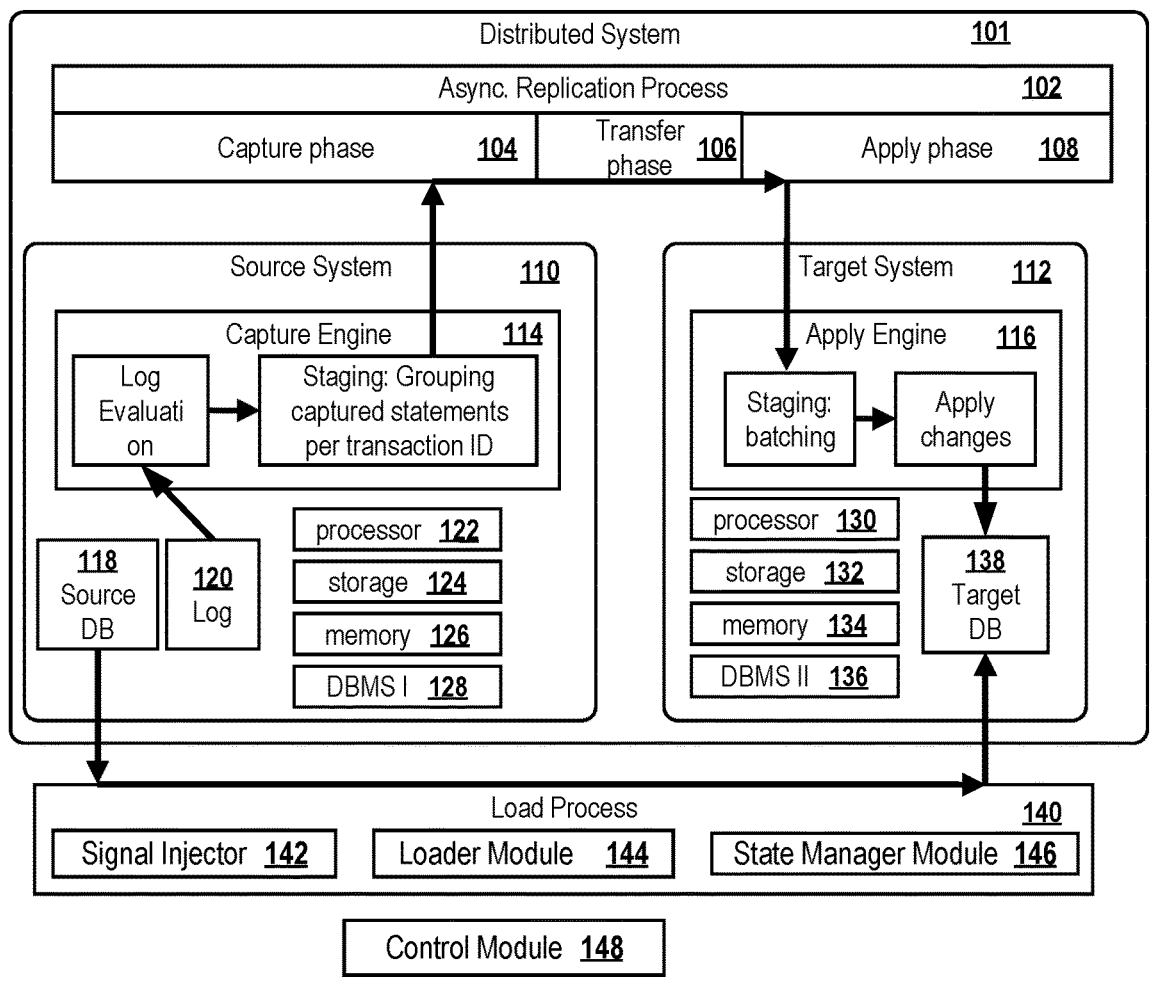
FIG. 1 depicts a distributed database system being controlled by a control system.

A "database" as used herein is a collection of electronic information that is organized in memory or on a non-volatile storage volume in the form of a particular, defined data structure. Said data structure may support or may be optimized for data retrieval by a particular type of database query.

A "database management system" (DBMS) is a software and/or hardware based system that is designed to allow the definition, creation, querying, updating and administration of one or more databases. Typically, a DBMS is operable to interact with a user, with other applications, and one or more databases managed by the DBMS to process some requests and to analyze data. Well-known DBMSs include DB2, MySQL, MariaDB, PostgreSQL, SQLite, Microsoft SQL Server, Microsoft Access, Oracle, SAP HANA, dBASE, FoxPro, IBM DB2, and others.

The term "statement" refers to a data processing command According to preferred embodiments, a statement is a Structured Query Language (SQL) statement, which performs a write operation (INSERT, UPDATE or DELETE) in a database or a read operation (SELECT) to read data from the database. A "statement" or "query" may have a particular "query type". According to some embodiments, a statement may be specified according to the syntax requirements of a database that does not support SQL as query language or that accepts also queries and statements in a different syntax and that maps such queries and statements to SQL syntax internally.

A "transaction" or "database transaction" is a logical unit of database operations which are executed as a whole to process user requests for retrieving data. A transaction is a larger unit that comprises and frames one or more statements. A transaction ensures that the action of the framed statements is atomic with respect to recovery.

The term "log" as used herein refers to a data structure acting as a container for information on all statements and transactions having been performed on a particular database. A 'log' may be implemented as electronic document, e.g. a text file, a binary file or a set of database records. A single physical data structure (file, set of database records, etc.) may comprise the logs of multiple databases.

The term "synchronization" of two databases as used herein means a process of transferring data or data changes from a source database to a target database in a way to ensure that a particular request will return an identical result irrespective of which of the two databases is used for processing the request.

A "capture engine" as used herein is a piece of program logic that is configured for evaluating a log of a source database to identify and extract write statements having introduced data changes in the data of a source database which have not been replicated to the target database yet. Preferentially, the capture engine belongs to an asynchronous replication framework. An "apply engine" as used herein is a piece of program logic that is configured for executing the write statements having been extracted by the capture engine on the data of the target database. Preferentially, the apply engine belongs to an asynchronous replication framework.

A 'control system' as used herein is a piece of software- and/or firmware- and/or hardware based program logic which is configured to control and to coordinate an asynchronous replication process and a load process in a "controlled system". The "controlled system" may comprise a source database and at least a target database. The control may comprise deciding if and when the asynchronous replication process and the load process to synchronize the source database and the at least one target database shall be executed.

According to embodiments, the control system may in addition comprise modules responsible for performing asynchronous replication, e.g. a capture engine and/or an apply engine, and/or a loader module for performing a load process.

In the following, embodiments of a computer-implemented method for controlling a system, e.g. a distributed database system which may be hosted on one or more computer systems, is described. The system comprises a source database and a target database. The system is configured to asynchronously replicate data changes of at least one part of the source database to the target database, the replication comprising evaluating, by a capture engine, a log of the source database for identifying the unreplicated data changes of the at least one part, transferring the identified data changes to an apply engine and applying, by the apply engine, the transferred data changes in the target database. The method comprises:

detecting a trigger event for initiating a loading of the complete data content of the at least one part to the target database;

in response to the trigger event and regardless of the number of log records the capture engine has not evaluated yet, triggering the apply engine to stop applying data changes of the at least one part in the target database;

in response to having stopped the applying of the data changes of the at least one part, triggering an inserting of a start load signal into the log at a current head of log position;

in response to the insertion of the start load signal and regardless of the number of log records the capture engine has not evaluated yet, initializing the loading of the complete data content of the at least one part to the target database, whereby during the loading, performing concurrent write statements on the at least one part of the source database is permitted;

after the loading has completed, triggering an inserting of an end load signal into the log at a current head of log position;

while the loading is performed, triggering the capture engine to store all write statements which are executed, according to the log, on the at least one part of the source database after the start load signal and before the end load signal in a queue;

after the loading has completed, triggering the apply engine to apply the write statements stored in the queue to the data content of the at least one part having been loaded completely into the target database, said applying comprising identifying and skipping all write statements whose resulting data changes were already transferred to the target database by the loading.

According to embodiments, the applying of the write statements in the queue to the data content of the at least one part having been loaded completely into the target database is performed regardless of the log record that is currently evaluated by the capture engine and is performed asynchronously from any replication process which concurrently are performed for other parts of the source database. This may be beneficial as the applying of the queued write statements (in a process referred herein as "draining") may be executed independently from any replication latency. This may increase performance.

According to embodiments, the loading is performed such that only the database table row of the source database that is currently read by the load process is locked against concurrent write statements, while all other rows of the source databases are unlocked during the load process. Thus, by using the lock mode "ROW", the loading will not slow down or prohibit writing transactional data changes to the source database.

According to embodiments, the method further comprises:

providing a control module; the control module is configured for controlling the capture engine, the apply engine, a signal injection module configured for inserting the start load signal and the end load signal and a loader module configured for controlling the loading; and controlling, by the control module, a current state of the at least one part, the current state being one of a set of states, the set of states comprising two or more of the following states: IDLE, ACTIVE, REFRESHING, SPILLING and DRAINING.

The ACTIVE state indicates that the at least one part is currently replicated from the source database to the target database and that the referential integrity of the at least one part having already been replicated to the target database is intact.

The IDLE state indicates that replication of the at least one part has been stopped, that the data of the at least one part that was already replicated to the target database lacks data changes which have been applied to the source database more recently than the start load signal and that the referential integrity of the at least one part having already been replicated to the target database may be violated.

The SPILLING state indicates that replication of the at least one part has been stopped, that the data changes applied later than the start load signal and before the end load signal are being queued, that the data of the at least one part may or may not have been loaded to the target database already, and in case it was already loaded, it lacks data changes which have been applied to the source database more recently than the end load signal and that the referential integrity of the at least one part having already been loaded to the target database may be violated. The data changes that are captured during the ongoing loading process are stored in the queue but are not applied to the target database before the loading process has completed.

The DRAINING state indicates that replication of the at least one part has been stopped, that the loading of the at least one part to the target database has completed, that the write statements stored in the queue are currently executed on the target database, that the data of the at least one part that was already loaded to the target database comprises at least all data changes which have been applied to the source database prior to the start load signal and may comprise the data changes imposed by the queued write statements having been already executed on the target database, and that the referential integrity of the at least one part having already been loaded to the target database may be violated.

According to embodiments, the method further comprises:
  receiving, by a control module, a request of an application program for a current state of the at least one part; and
  identifying, by the control module, the current state of the at least one part;
  returning, by the control module, the identified current state to the application program.

Thus, the control module may act as a single central interface via which a client application program may request data from the source or the target database, whereby the client application program does not know and does not have to adapt its queries to the two different databases (source and target). Rather, the client program is provided with state information in respect to the at least one part of the database which may enable the client application program to decide if a particular query should be submitted now or should be submitted later. For example, the control module may interoperate with a state manager module for identifying the current state of the at least one part, or may comprise the functionality of the state manager module.

According to embodiments, the method further comprises:
  comparing, by the application program, the received state with a first requirement, the first requirement being indicative if referential integrity of the data in the target database is required or not;
  if the first requirement indicates that referential integrity is required, processing, by the application program, the data of the at least one part in the target database only in case the received state is ACTIVE;
  comparing, by the application program, the received state with a second requirement, the second requirement being indicative how recent the data in the at least one part of the target database must be;
  if the second requirement indicates that the at least one part in the target database must comprise the same data content as the at least one part in the source database at the moment of sending the request from the application program to the control module, processing, by the application program, the data of the at least one part in the target database only in case the received state is ACTIVE;
  if the second requirement indicates that the at least one part in the target database must comprise at least all data changes which were contained in the at least one part in the source database at the moment of the trigger event (202), processing, by the application program, the data of the at least one part in the target database only in case the received state is ACTIVE or DRAINING; For example, the trigger event may be a refresh request of said application program, the refresh request having been sent to the control module previously in order to trigger the loading of the at least one part on which an analysis by the application program shall be performed; the application program may send the request for the current state of the at least one part later, in order to check if the at least one part was meanwhile completely loaded to the target database and to check if the analysis of the at least one part can already be executed. For some analysis, it may be sufficient to be performed on data that is quite actual, but not perfectly in sync with the source database. In this case, the analysis may be performed also on database parts which are in the DRAINING state and therefore may lack the changes which were introduced in the source database during the loading process and probably the changes having been added afterwards.

According to some embodiments, the application program delays processing the at least one data part until the current state "SPILLING" has changed into DRAINING or ACTIE to prevent interfering with an ongoing load process and to prevent an analysis that may be executed on only a small fraction of the available data at a moment when the majority of the data of the at least one part has not been loaded yet. In addition or alternatively, the application program may delay processing the at least one data part until the current state "IDLE" has changed into DRAINING or ACTIE to prevent processing and analyzing outdated data.

This may have the advantage that the current status of the table T that shall be accessed by an analytical query can be accurately reported to the user or client program. The replication states ACTIVE, IDLE, SPILLING and DRAINING allow informed decisions as to when the table may be used by applications again. Some use-cases (e.g. trend analysis) can start using the table right-away, or after state DRAINING is reported. Other use-cases with stricter synchronization requirements may hold using the table until state ACTIVE has been reached.

Different analytical client application programs and different analytical sub-modules thereof may have different requirements in terms of data consistency and/or the currency of the analyzed data. Thus, the control module may act as an interface that provides status information to the client application program, the status information comprising sufficient information to enable the client application program if a particular analytical task that will be performed on the target database should be executed immediately, although the data in the target database may not comprise all data changes that currently exist in the source database and/or although the data in the target database may currently violate referential integrity.

According to some embodiments, the at least one part of the source database is an individual database table of the source database. During the loading of said individual database table to the target database, the asynchronous replication of any one of the other tables of the source database continues unaffectedly.

According to some embodiments, the at least one part of the source database is an individual column of a database table of the source database. During the loading of said individual database table column, the asynchronous replication of any one of the other columns of said table or of other database tables of the source database continues unaffectedly by the loading process.

According to some embodiments, the at least one part of the source database is a subset of the database tables of the source database. During the loading of said subset, the asynchronous replication of all other database tables of the source database not belonging to said subset continues unaffectedly by the loading process.

Performing the method according to embodiments of the invention for individual parts of the source database may be advantageous as the asynchronous replication of all other database parts is not suspended or impacted in any way. Thus, in case a user requests an immediate analysis of data contained in a particular table, thereby triggering a load process for said table, it is not necessary to interrupt the replication of all other tables and also load said other tables to the target database. This will accelerate the start of the requested analysis, because less data has to be transferred during the load phase from the source to the target database.

According to some embodiments, the at least one part of the source database is the totality of database tables of the source database.

According to embodiments, the trigger event is one of:
an event of receiving, via an interface of a control module, a request to initialize the loading; the request may be submitted by a user via a user interface or by an application program automatically;
an event of automatically determining, by the control module, that the number of log records in the log which have not been evaluated by the capture engine yet exceed a threshold value; this may prevent the latency time of the replication process from becoming too long;
an event of restarting an IT-environment that hosts the target database; for example, the computer system or a virtual machine on which the target database is hosted may have to be restarted; it may receive all data de novo by means of a load process;
an event of automatically determining, for the first time, that the at least one part has been created in the source database;
an event of determining that at least a fraction the log is no longer available for performing the replication, said fraction comprising unreplicated data changes. This may happen, for example, in case of a large latency time if a part of the log was written to tape before it was evaluated by the capture engine, or is about to be written to tape.

According to embodiments, the source database comprises a signal table. The insertion of the start load signal in the log comprises:
performing, by a signal injection module, write statement on the signal table;
logging, by a logging module, said write statement on the signal table in the same way as write statements on other tables of the source database are logged for creating and updating the log, thereby creating a log record being indicative of the write statement to the signal table; and
using said log record being indicative of the write statement to the signal table as the start load signal. The insertion of the end load signal may be implemented analogously by performing, by the signal injection module, a write statement on the signal table. The data records in the signal table resulting from said write statements may comprise, for example, one or more flags, the flags being indicative of whether the data record relates to a start load signal or an end load signal and/or being indicative of whether the start or end load signal relating to said data record is still valid or not.

According to embodiments, the signal table is configured for solely storing data records for start load events and end load events and optionally also for storing a validity flag for each of said load events and for storing a "start-type" or "end-type" flag. The signal table is free of any payload data.

FIG. 1 depicts a distributed system 101 in the form of a distributed multi-database system that comprises a source database 118 and at least one target database 138. The system 101 supports transferring data from the source to the target database by two different processes: by an asynchronous replication process 102 indicated by a chain of arrows starting from log 120 and terminating at the target database 138, and by a load process 140 indicated by a chain of arrows starting at source database 118 and also terminating at the target database. The system 101 is controlled by a control module 148 configured to control the system 101 by performing a method according to any embodiments of the invention described herein. The expression "controlling a system" as used herein means that at least the coordination of the loading process 140 and the replication process 102 in said system is controlled by the control module 148.

The distributed system 101 depicted in FIG. 1 is hosted on a source computer system 110, e.g. a first database server, and a target computer system 112, e.g. another database server, which may be connected by a network, e.g. the Internet or an intranet.

The source computer system 110 may comprise a main memory 126, one or more processors 122, and a non-transitory computer readable storage medium 124. The database management system 128 can be, for example, an online transaction processing (OLTP) database management system (DBMS) that is configured for managing the data stored in the source database 118 and for managing queries to be processed on the data in the source database.

The storage medium 124 may comprise computer readable instructions which implement and provide for a capture engine 114 and may also comprise a log 120 of the source database 118. The log comprises a history of statements and transactions having been performed on the source database. The log is continuously updated. For example, the log may consist of one or more log files or may consist of one or more tables of the source database or another database.

The target computer system 112 may comprise a main memory 134, one or more processors 130, and a non-transitory computer readable storage medium 132. The database management system 136 can be, for example, an online analytical processing (OLAP) DBMS that is configured for managing the data stored in the target database 138 and for managing queries to be processed on the data in the target database. The storage medium 132 may comprise computer readable instructions which implement and provide for an apply engine 116. In a standard apply operation of the apply engine during asynchronous replication, the transferred data changes and corresponding write statements are executed directly on the target database without checking if an existing data record was duplicated. This is not necessary as in the replication process, only unreplicated changes are transferred. To the contrary, applying write processes stored in a queue generated for the load process may comprise performing said checks.

In some embodiments, the structure of the source database is optimized for quickly performing database queries of a first type (OLTP queries been just one example) and that the structure of the target database is optimized for quickly performing database queries of another, second type (OLAP queries being just one example). It is also possible that the source DBMS and the target DBMS are of the same type, e.g. an OLTP system, and OLAP system, a graph based database, a triple store, a columnar database or the like. It is also possible that the source database and/or the target database are implemented as in-memory databases. According to other embodiments and examples, the data in the source database may be replicated not only to one target database, but rather to a plurality of target databases. In this case, the replication and the loading to each of said further target databases may be managed by a single control module as described for any of the embodiments of the invention involving a system 101 that merely comprises the single target database.

The capture engine is configured to continuously evaluate the log 120 in order to identify new data changes having been stored in the source database by a write statement, e.g. an UPDATE, INSERT or DELETE statement, executed on the source database and which have not yet been replicated to the target database. The capture engine 114 may group the identified unreplicated data changes in a staging area. For example, all write statements whose imposed data changes have not been replicated may be grouped in the staging area according to a shared transaction ID. If a commit log record occurs for a certain transaction ID, the capture engine may send the group of statements corresponding to said commit log record to a staging area on the target engine. Said sent group may also be called "unit of recovery" or UR. The target engine can apply the individual URs as they arrive, but may also decide to group the received URs into larger units ("batches") and apply them in a batch fashion. Applying in batch mode may increase the throughput but may increase replication latency.

The identification of unreplicated write statements and their grouping may be referred to as capture phase 104. In a succeeding transfer phase 106, the identified and grouped statements are transferred from the capture engine 114 to the apply engine 116. In a staging area of the apply engine, the transferred and grouped statements may optionally be batched for updating the target database 138 with the transferred data changes in a batch mode. The transferred to and optionally batched changes are applied by the apply engine 116 which executes the transferred statements. For example, the apply engine may perform the captured and transferred INSERT, UPDATE and DELETE statements that have been previously executed in the source database, thereby bringing the target database in sync with the source database to ensure that database queries that are performed on the target database return the same results as when executed on the source database. The replication process 102 is performed asynchronously. This means that database queries, e.g. SELECT or UPDATE queries, can be and are performed on the source database concurrently, whereby the DBMS 128 ensures consistency and transactional isolation of the queries.

In addition, the distributed system 101 supports the execution of a load process 140. A loader module 144, which may be an external application program or module specifically adapted to a particular source database type, or that may be a generic loader module that uses "SELECT *" syntax, e.g. a "SELECT * from table" statement, to extract all data from a particular table or other part of the source database that shall be loaded to the target database. The loading process operates directly on the content of the source database, not on the log, and extracts all data that is contained in the part of the source database to be loaded at the moment when the loading starts. Thus, contrary to the replication process, the loading does not discriminate between replicated and unreplicated data changes and is typically much faster, but also may involve the transfer of a comparatively large amount of data. A control module 148 according to embodiments of the invention coordinates the replication process 102 and the load process 140 in a manner that may allow a user to take advantage of the high transfer speed of the load process as well as the resource-saving properties of an incremental replication process 102, whereby at the same time referential integrity of the data having been transferred to the target database is ensured. According to embodiments, performing an analysis on the data in the target database may be allowed to start even earlier in case referential integrity is not absolutely necessary. The control of the replication process and the loading process will be described in more detail in FIGS. 3, 4 and 5.

The load module may perform an initial load process to establish an initial instance (or "copy") of the source database or a part thereof on the target database. Said copy can be used as a starting point from which the asynchronous replication can start. Said start may take place when initially setting up the system 101, after a system failure or upon a user's or client application's request, for example.

Figure 2:
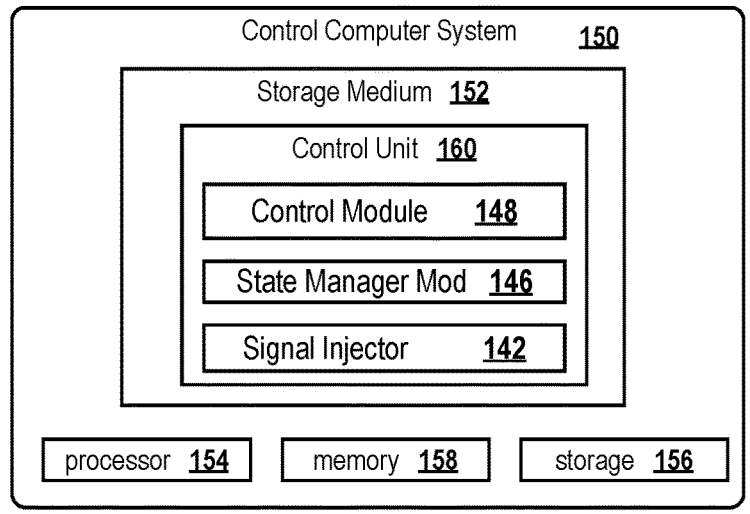
FIG. 2 depicts a control system in greater detail.

The controller module 148 may be operationally coupled to a loader module 144, a signal injection module 142, and a state manager module 146. The operational coupling can be implemented such that the control module, the signal injector module and the state manager module are implemented as individual application programs or modules thereof which may respectively be hosted on different computers connected to each other via a network connection. It is also possible that the modules 148, 142 and 146 and optionally also the loader module 144 are hosted on the same computer system, e.g. a controller computer system 150 as depicted in FIG. 2, or on the source system 110 or the target system 112. In some embodiments, the modules 148, 142 and 146 and optionally also the loader module 144 constitute or are contained in a single piece of program logic, e.g. a particular application program, a plug-in to a database management system, a piece of firmware and/or some hardware-implemented program logic (an example for said single piece of program logic is depicted in FIG. 2—"control unit 160").

A load process 140 has a throughput that typically is orders of magnitude higher than the throughput achievable by asynchronous replication 102, because the load process does not involve evaluating the log. Rather, data is copied directly from the source DBMS storage. In situations where latency is high but a subset of tables is required to be synchronized (or re-synchronized) immediately, embodiments of the invention allow an immediate refresh of the required parts of the data in the target database. Being able to perform a load process also in high latency situations and still being able to ensure data consistency in the target site may provide for a rapid catch-up and synchronizing of selected parts of the data in the target database with the data in the source database.

An "asynchronous replication process" as used herein is a process of incrementally replicating data changes from a source database to a target database, whereby the capturing of the incremental data changes in the source database is executed in parallel and independent of the execution of read or write statements on the source database.

The expression "triggering a module to perform an operation" as used herein may mean an act of calling, instructing or otherwise causing said module to perform said operation. The triggering may be implemented according to a publisher subscriber design pattern, by a call to another module or program or by starting a program routine being internal to the same program logic that has performed the call.

FIG. 2 shows a control system 150, e.g. a computer, comprising a processor 154, a main memory 158 and a storage medium 152 having stored thereon computer readable instructions that provide for the control module 148. According to the embodiment depicted in FIG. 2, the controller module, the state manager 146 and a signal injector 142 are contained in an executable program logic referred herein as control unit 160. In other embodiments, the modules 148, 146 and 142 are hosted on two or more different computer systems and the control unit 160 is implemented as a distributed control unit. The distributed system 101 may be connected to the control system via a network.

Figure 3:
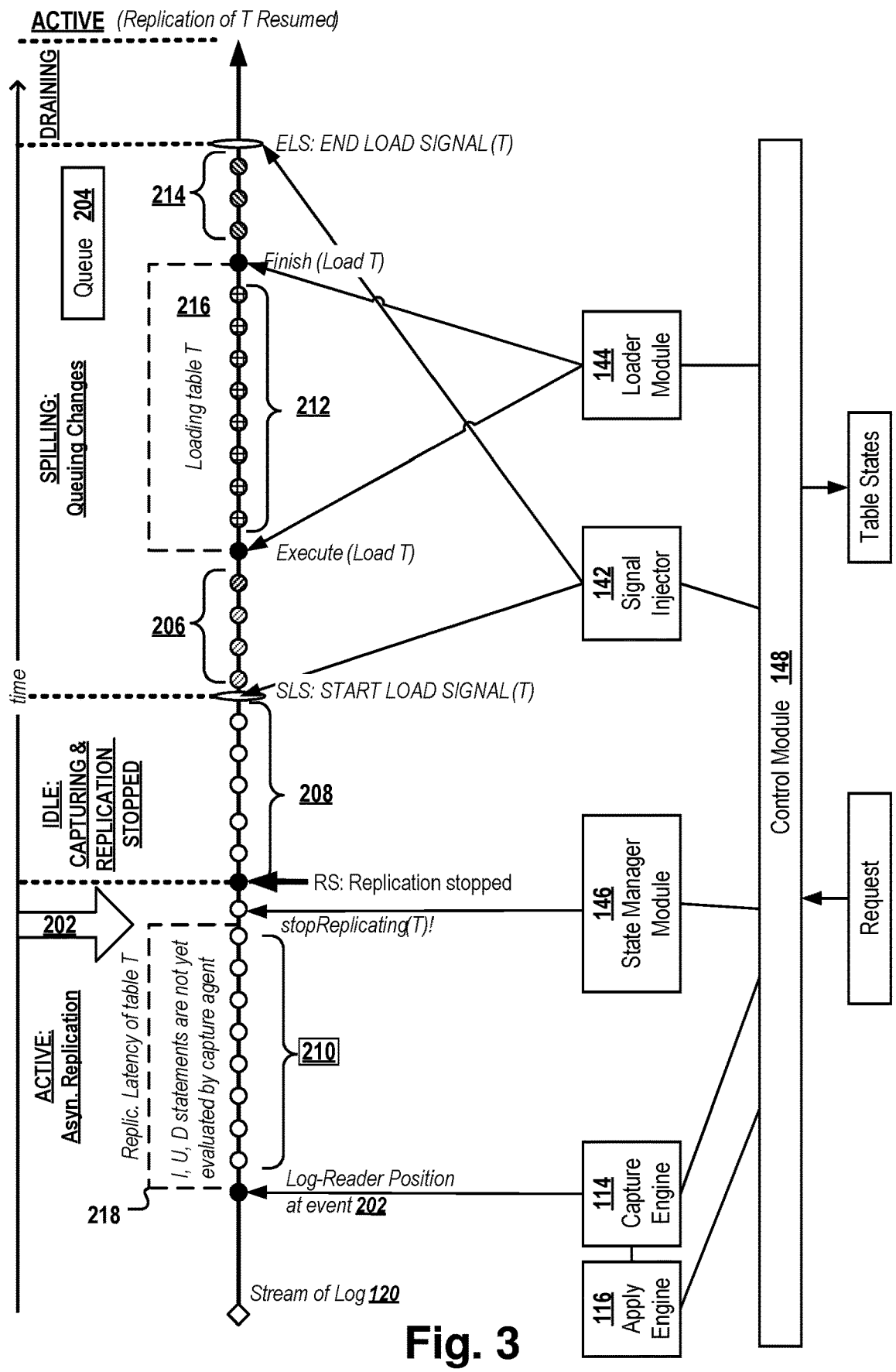
FIG. 3 depicts different states of a table T being loaded to the target database.

FIG. 3 depicts different states of a table T being loaded to the target database and illustrates how the log 120 of the source database is used by the control module 148 for controlling and coordinating the replication 102 and the loading process 140. A chronologically ordered sequence of log records of the log 120 relating to committed INSERT, UPDATE or DELETE statements for table T is depicted as a chain of beads along the stream of the source-DB log. The capture engine reads the log stream of the source DB for table T (the log may comprise the statements of other table also, which may also be evaluated by the capture engine, but they are not depicted in FIG. 3 for illustration purposes).

At first, the table T may be asynchronously replicated to the target database as described before. In this stage, the table T has assigned the state "ACTIVE" to indicate that the table is actively replicated and its referential integrity is intact, i.e., its data is consistent with respect to all other tables.

Then, the control module may detect a trigger event 202 for starting a load process. For example, the control module may receive a request of a client application program to perform an analysis on the target database, whereby the analysis should be done on the most recently available data of table T. At the moment of detecting the trigger event 202, a plurality of log records 210 corresponding to statements, including write statements, having already been performed in the source database before the event 202 was detected, have not been evaluated by the capture engine yet. This is indicated by the dotted box "replication latency of table T" and the position of the log reader of the capture engine. In asynchronous replication, high latency situations may happen for a variety of reasons: resource shortages on the target system, the necessity to perform a recovery after failure and subsequent "catch-up" phases, network congestions, etc. High latency times are especially common in heterogeneous replication environments, e.g. when the source DBMS is a specialized OLTP system and the target DBMS is optimized for processing OLAP queries (and thus not capable of ingesting large quantities of complex changes).

In response to the determination of the trigger event 202, the control module initiates the stopping of the replication process 102 for table T. This is done by instructing the capture engine and/or the apply engine to interoperatively agree on a moment in time RS where the apply process for table T may be stopped. It must be ensured that before the load process for table T is started, the apply engine has stopped performing apply operations on table T in the target database. Preferentially, it should be ensured that at said agreed-upon moment in time ongoing apply processes have been performed completely ("graceful termination of the apply process for table T") to provide for a consistent point of recovery in case of an erroneous or aborted load process, e.g. by using a "shadow table approach" where a backup copy of a table is preserved in the target database until an ongoing load process for said table was completed successfully. Stopping the apply process or the complete replication process for table T does not depend on the number of statements 210 in the log that have not yet been evaluated. After the replication has stopped, the state manager module 146 assigns the table state "IDLE" to the table T. State IDLE indicates that replication is stopped for table T and that data changes being more recent than the moment of stopping of the replication for table T are not available for queries in the target database. Referential integrity may be violated when performing an analysis on table T in the target database. In an important aspect, the control module does not wait with the triggering of the stopping until the statements described by log records 210 have been evaluated by the capture engine. Rather, the stopping of the replication of table T and the loading is initiated as soon as possible irrespective of the number of unevaluated log records 210. This may be advantageous, as it is not necessary to await the processing of the log records 210 for allowing the load to start in order to ensure data consistency in the target database. Data consistency may be ensured by other means which are explained later.

After the apply process or the replication of table T has stopped at the agreed upon a moment in time, the control module 148 calls the signal injector module 142 to insert a start load signal SLS, e.g. by performing an INSERT statement of a signal table of the source database (not shown). The state manager module 146 sets the state of table T to "SPILLING" at a moment in time that is reflected by the SLS signal in the log 120. All statements having committed in the source database during the SPILLING state are queued to ensure they can be transferred to the target database later in case they were not included in the load process of table T. During the whole SPILLING phase, the capture engine collects write statements that are performed in a time interval defined by the SLS signal and an end load signal ELS in the log for table T in the source database in a queue 204. As the loading is performed preferentially with lock mode "ROW", concurrent write statements to Table T in the source database will almost never be delayed by the ongoing load process. The actual loading process is indicated in FIG. 3 by box 216. Data changes imposed by write statements 208 having committed in the source database before the start load signal SLS can safely be assumed to be included in the load process. Thus, the replication stop of table T will not result in loosing said data changes and will not result in data consistencies caused by omitting transferring data changes 208 to the target database. However, as the exact moment of starting and terminating the physical load process 216 may not be known and as it may be unknown if transactions having committed on table T in the source database during the ongoing load process were included in the loading, there is a risk of missing one or more of the data changes imposed by statements 206, 212 and 214. In fact, statements 206 will not be missed by the load process, some of the statements 212 may be missed by the load process and statements 214 will definitively be missed by the load process, but as the exact time of the physical loading may not be known, all statements 206, 212 and 214 having committed in the source database between the SLS and ELS are stored in the queue 204 by the capture engine. However, the statements in the queue are not applied during the IDLE state phase of table T. In the IDLE state, the referential integrity of the data of table T in the target database may be violated.

The control module 148 monitors the load process 140. After completion of the loading of table T, the control module calls the signal injector module to insert the end load signal ELS in the log 120. After the injection of the ELS, the control module calls the state manager module 146 to change the state of table T from SPILLING to DRAINING and calls the apply engine to apply the write statements in the queue 204 on the copy of table T having been loaded into the target database. The applying of said write statements is performed in a way that for each write statement it is checked if the changes imposed by said statement were already transferred to the target database during the load process 140 or not. For example, before executing an INSERT statement of queue 204 on table T in the target database, the copy of table T may be evaluated if it already comprises the value(s) to be inserted by said INSERT statement. Although this "adaptive" or "error save" apply mode may be computationally more demanding than a standard apply approach performed by the apply engine during normal asynchronous replication 102, the additional computational effort is usually low as the number of write statements having committed in the source database between the SLS and ELS signal is usually not high. Referential integrity of table T in the target database may be violated.

The control module 148 monitors the applying of the write statements of the queue 204. After all write statements of the queue have been evaluated and, if no conflict or inconsistency arises, also have been performed on table T in the target database, the control monitor calls the state manager module to change the state of table T from DRAINING to ACTIVE. In addition, the control module causes the capture and the apply engine to resume to asynchronously replicate all write statements on table T having been committed after the ELS signal to the target database.

The control and coordination process was described for illustrative purposes only for a particular table T. However, in other embodiments, the at least one part of the source database whose replication and loading is controlled by the control module may be a set of one or more columns, one or more tables or may be the whole content of the source database. Preferentially, the at least one part is a set of one or more columns or tables. This has the advantage that the analysis to be performed on only a sub-set of the available data can be started earlier, because data that is not needed for analysis does not have to be loaded to the target database in response to the trigger event.

Figure 4:
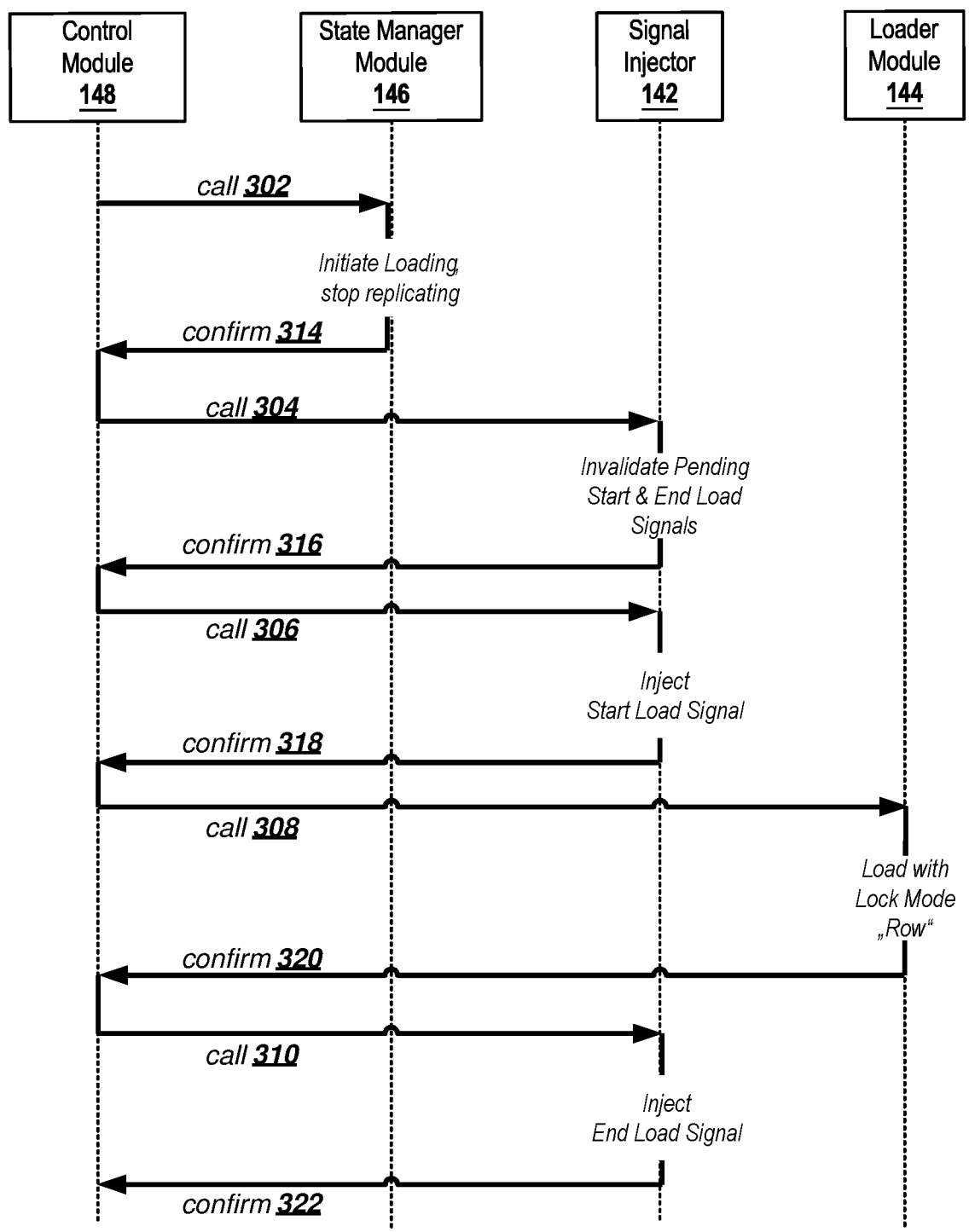
FIG. 4 depicts various commands used by a control module to control the loading and the replication of a table.

FIG. 4 illustrates multiple calls and confirmation messages exchanged between the control module 148, the state manager module 146, the signal injector module 142 and the loader module 144 in order to coordinate a load operation 140 irrespective of the number of log records 210 of statements having already committed in the source database but not having been evaluated by the capture engine 114 yet.

In response to determining or receiving a trigger signal 202, the controller module 140 may send a call 302 to the state manager module 146 in order to instruct the state manager module to trigger some preparatory steps before the loading is allowed to start. For example, the state manager module may cause, in response to the call 302, the capture engine and/or the apply engine to agree upon an earliest allowed moment for terminating the apply process for table T. Typically, the agreement can be reached within a few, e.g. 5, minutes, sometimes within a few seconds. The stopping does not wait until all currently unevaluated data changes on table T have been identified and evaluated in the log. When the apply process or the complete replication for table T was stopped, the state manager returns a confirmation message 314 to the control module 148.

In FIG. 3, the black bead at event 202 in the log stream marks the point in time expressed in terms of the log stream at which the table T has been put into state IDLE. The arrow "changeTableState(IDLE, T)" indicates the moment when the control module sends a call to initiate an agreement process between the control unit, the capture engine and the apply engine to determine the earliest possible moment in time when the apply process for table T can stop. The arrow "RS" indicates said agreed upon moment. At this moment, the apply or the replication of the table T has stopped ("Replication stopped—RS). After said moment "RS", the apply process for the table T has stopped and table T is in IDLE state.

Log records (insert, updates, deletes) between the event 202 and the position of capture engine log reader further behind have not yet been evaluated by the capture engine. The effect is the latency 218 for table T. After having received confirmation message 314, the control module triggers changing the state of table T from ACTIVE to IDLE.

After having received confirmation message 314, the control module calls 304 the signal injector module 142 to instruct the module 142 to invalidate all SLS and ELS signals having been injected into the log 120 upon previous trigger events. This will prevent filling the queue 204 with write statements which need not to be queued as the changes imposed by said write statements are covered by the load process to be started soon.

After having received a confirmation message 316 that the pending signals were invalidated, the control module sends a call 306 to the signal injector module that triggers the signal injector module to insert a start load signal SLS (see FIG. 3) after a moment RS when the apply process was stopped for table T. The SLS signal indicates that all log records after this particular log record have potentially not been covered by the load process that is to be started next.

After having received confirmation message 318 indicating that the SLS signal was successfully injected, the control module triggers changing the state of table T from IDLE to SPILLING. In addition, the control engine sends a command 308 to the loader module to start the actual loading process, preferentially in the lock mode "row". This will lock only the one particular row of table T that is currently read by the loading process. All other rows of table T may be concurrently accessed and altered by statements performed on the source database. For example, the UNLOAD utility of DB2/zOS may perform a load process with "share level change", "cursor stability isolation level" and transfer the entire content of table T from the source database into the target database, thereby replacing the currently existing content for table T in the target database. The load is started and executed regardless of current latency 216. As a result, the data in table T in the target database is refreshed immediately, without having to wait for replication to have caught up.

After having received a confirmation message 320 that the load process for table T has successfully terminated, the control module sends a call to the signal injector module to inject an end load signal ELS (see FIG. 3) into the log 120. The ELS signal indicates that the load of the table T has been finished and that all log records written after the log record corresponding to this particular ELS signal can be replicated again normally. The signal injector module may send a confirmation message 322 to the control module to indicate successful injection of the ELS signal. After having received confirmation message 322, the control module triggers changing the state of table T from SPILLING to DRAINING.

During the whole process of exchanging calls 302-310 and confirmation messages 314-322, the capture engine continues to read and evaluate log records from the Source DB, thereby ignoring log records for table T because the latter is in state IDLE. If the capture engine discovers the SLS signal for table T in the log 120, it may communicate this finding to the apply engine and may instruct the apply engine to set up a queue 204. After this has been done all (committed) write statements 206, 212, 214 for table T are transferred again to the apply engine. The latter stores all of them in the queue for table T. Alternatively, the queue may be accessible by the capture engine and the apply engine and the capture engine may store the write statements 206, 212, 214 for table T in the queue 204. All log records and corresponding write statements before the SLS signal are seen and gathered by the load process.

When the capture engine reads the ELS signal for table T it, it instructs the apply engine to start to apply the write statements stored in the queue 204 for table T on the target database and puts the table T into state DRAINING. This may be executed by notifying the control module that the ELS signal for table T was reached, thereby causing the control module to initiate said state change and the performing of the statements in the queue. The apply engine then starts to "drain" the queue by performing the write statements stored in the queue in a so called "adaptive apply" mode. This mode prevents inserting duplicate changes (changes between the SLS and ELS signal in the log stream in FIG. 3 imposed by any one of the statements in the groups of statements 206, 212, 214 that got picked-up by the load process). As long as the "drain" process of the queue is running, all further log records that get collected by the capture engine for table T are appended to the queue. The loading of table T makes the content of table T immediately available for queries in the target database. Changes having committed between the start and end signals are processed and applied to the target in a draining process which is independent of the current log reader position and hence is also independent from replication latency 216. When the queue drain completed, the table t goes back into replication state ACTIVE.

Thus, according to embodiments, the control module in interoperation with the capture and apply engines may start a load of a table T irrespective of the current capture log reader position and latency. This is done by building upon an asynchronous signal table interface to embed signal into the source transaction log, plus a synchronous interface to stop replicating data changes of table T to the target database and to invalidate SLS and ELS signals right before the loading of table T starts. Thus, the calls 306 and 310 may be asynchronous which means that the control module does not have to trigger an agreement process with the capture and apply engines but may simply initiate the insertion of the signals. It merely has to be ensured that the replication was stopped on table T before inserting the SLS signal. The calls 302 and 304 may be synchronous calls, meaning that process of initiating the loading and also the process of invalidating previously injected signals may involve a process of cording the operation of the capture and apply engines in a way that currently executed replication operations for table T, e.g. complex transactions currently applied on the target database, or the processing of a previously generated queue, can terminate gracefully.

Figure 5:
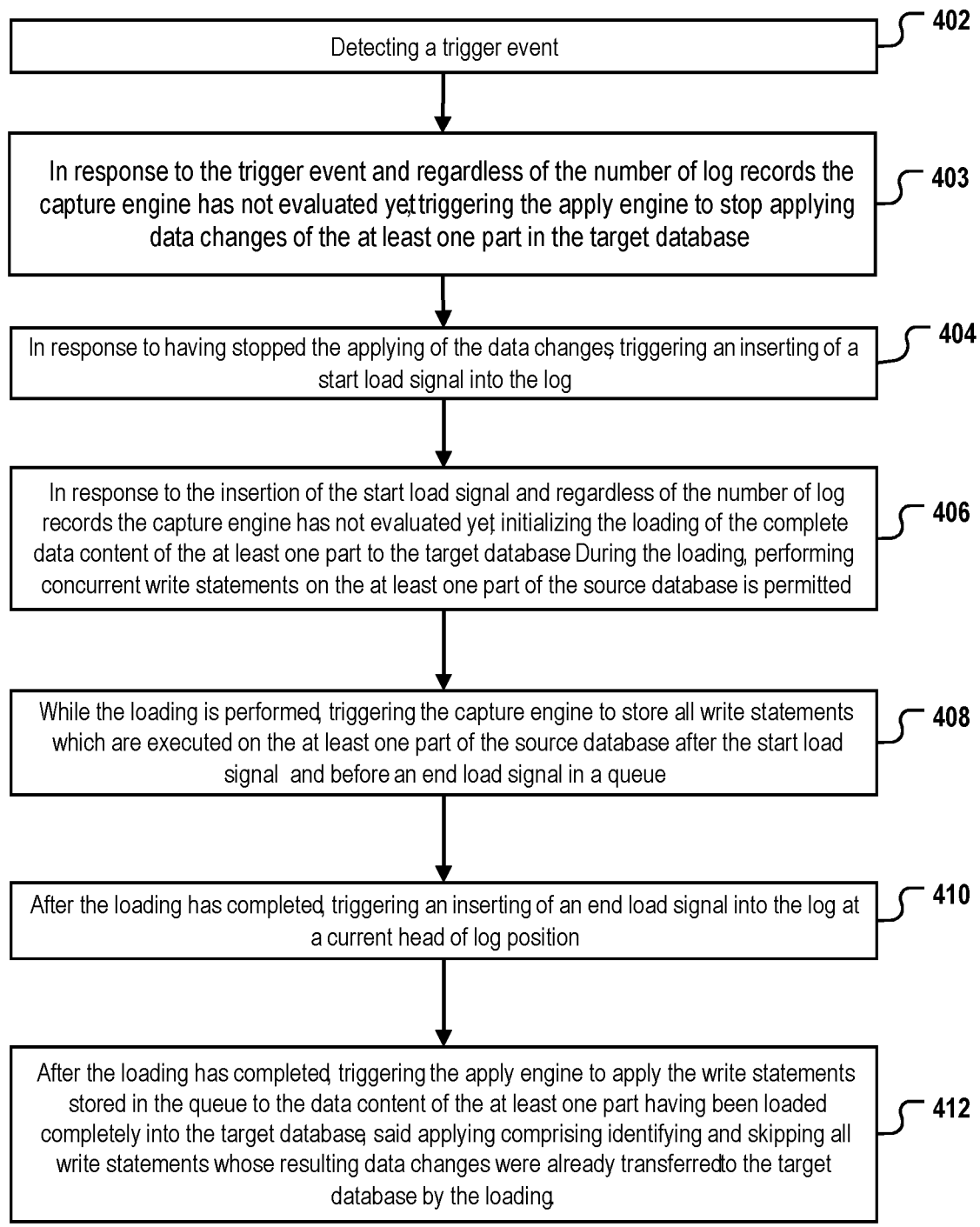
FIG. 5 is a flow chart of a method according to an embodiment of the invention.

FIG. 5 is a flowchart that illustrates a method according to an embodiment of the invention for controlling a distributed system 101 comprising a source database and at least one target database as depicted, for example, in FIGS. 1 and 2. In the following, the method of FIG. 5 will be described by making reference to figure elements of FIGS. 1-3. The method may be executed, for example, by a control module 148 alone or in interoperation with further modules such as a state manager module 146, a signal injector module 142 and/or a loader module 144.

In a first step 402, the control module detects a trigger event 202 for initiating a loading 140 of the complete data content of the at least one part to the target database. The at least one part may be a single database table T, for example.

In response to the trigger event and regardless of the number of log records the capture engine has not evaluated yet, the control module triggers the apply engine in step 403 to stop applying data changes of the at least one part in the target database;

In response to having stopped the applying of the data changes of the at least one part, the control module in step 404 causes the signal injection module to insert a start load signal SLS into the log 120 at a current head of log position.

In response to having stopped said apply process, and regardless of the number of log records the capture engine has not evaluated yet, the control module 148 causes the loader module 144 in step 406 to start loading the complete data content of the at least one part to the target database, whereby during the loading, performing concurrent write statements on the at least one part of the source database is permitted.

While the loading is performed, the control module 148 in step 408 triggers the capture engine to store all write statements which are executed, according to the log, on the at least one part of the source database after the start load signal SLS and before an end load signal ELS in a queue 204.

After the loading has completed, the control module 148 in step 410 triggers the signal injection module to insert an end load signal ELS into the log 120 at a current head of log position. In addition, in step 412 the control module triggers the apply engine to apply the write statements stored in the queue to the data content of the at least one part having been loaded completely into the target database, said applying comprising identifying and skipping all write statements whose resulting data changes were already transferred to the target database by the loading.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for controlling a system, the system comprising a source database and a target database, the computer-implemented method comprising:
   detecting a trigger event for initiating a loading of a complete data content of at least one part of the source database to the target database;
   in response to the trigger event and regardless of a number of log records that a capture engine has not evaluated, triggering an apply engine to stop applying of unreplicated data changes of the at least one part of the source database to the target database;
   in response to stopping the applying of the unreplicated data changes of the at least one part of the source database to the target database by the apply engine, triggering an insert of a start load signal into a log of the source database at a current head of log position;
   in response to the insertion of the start load signal and regardless of the number of the log records that the capture engine has not evaluated, initializing the loading of the complete data content of the at least one part of the source database to the target database, wherein during the loading of the complete data content, concurrent write statements are performed and permitted on the at least one part of the source database;
   after the loading of the complete data content is complete, triggering an insert of an end load signal into the log at a current head of log position;
   while the loading is performed, triggering the capture engine to store all write statements which are executed, according to the log of the source database, on the at least one part of the source database after the start load signal and before the end load signal in a queue;

after the loading has completed, triggering the apply engine to apply the write statements stored in the queue to the complete data content of the at least one part of the source database having been loaded completely into the target database, wherein the applying of the write statements comprises identifying and skipping all write statements of which resulting data changes were already transferred to the target database by the loading.

2. The computer-implemented method of claim 1, the computer-implemented method comprising:

in response to the trigger event and before the inserting of the start load signal, invalidating all start load signals and end load signals previously inserted into the log of the source database.

3. The computer-implemented method of claim 1, the computer-implemented method further comprising:

in response to the trigger event, causing the capture engine and the apply engine to agree upon an earliest possible moment in time when the applying of the unreplicated data changes of the at least one part of the source database stopped.

4. The computer-implemented method of claim 3, wherein the start load signal is inserted into the log of the source database at or after a log record that reflects the earliest possible moment.

5. The computer-implemented method of claim 1, the computer-implemented method comprising:

in response to the trigger event, instructing the capture engine to stop evaluating the log of the source database for identifying unreplicated data changes of the at least one part of the source database.

6. The computer-implemented method of claim 5, the computer-implemented method comprising:

delaying the inserting of the start load signal until a confirmation message is received, the confirmation message indicating that the evaluating of the log of the source database for identifying unreplicated data changes of the at least one part of the source database was stopped successfully.

7. The computer-implemented method of claim 1, wherein the applying of the write statements in the queue is performed regardless of the log record and is performed asynchronously from any replication process being concurrently performed for other parts of the source database.

8. The computer-implemented method of claim 1, wherein the loading of the complete data content comprises only a database table row of the source database that is currently read by the load process is locked against concurrent write statements, while all other rows of the source databases are unlocked during the loading of the complete data content.

9. The computer-implemented method of claim 1, the computer-implemented method further comprising:

providing a control module configured to control the capture engine, the apply engine, a signal injection module insert the start load signal and the end load signal, and a loader module.

10. The computer-implemented method of claim 9, the computer-implemented method comprising:

controlling, by the control module, a current state of the at least one part of the source database, the current state being one of a set of states, the set of states comprising two or more of the following states: IDLE, ACTIVE, REFRESHING, SPILLING and DRAINING.

11. The computer-implemented method of claim 1, the computer-implemented method further comprising:

receiving, by a control module, a request of an application program for a current state of the at least one part of the source database; and identifying, by the control module, the current state of the at least one part of the source database.

12. The computer-implemented method of claim 11, the computer-implemented method comprising:

returning, by the control module, the identified current state to the application program.

13. The computer-implemented method of claim 12, the computer-implemented method further comprising:

comparing, by the application program, the received state with a first requirement, wherein the first requirement indicates whether a referential integrity of the data in the target database is required.

14. The computer-implemented method of claim 1, wherein the at least one part of the source database being comprises:

an individual database table of the source database; or an individual column of a database table of the source database; or a subset of database tables of the source database; or a totality of database tables of the source database.

15. The computer-implemented method of claim 1, wherein the trigger event being one of:

an event of receiving, via an interface of a control module, a request to initialize the loading of the complete data content;

an event of automatically determining, by the control module that the number of the log records in the log of the source database that have not been evaluated by the capture engine exceed a threshold value;

an event of restarting an environment that hosts the target database;

an event of automatically determining, for the first time, that the at least one part has been created in the source database; and an event of determining that at least a fraction the log is no longer available for performing the replication, said fraction comprising unreplicated data changes.

16. The computer-implemented method of claim 1, wherein the source database comprises a signal table, wherein the insertion of the start load signal in the log comprises:

performing, by a signal injection module, a first write statement on the signal table;

logging, by a logging module, the first write statement on the signal table as the write statements on other tables of the source database are logged to create a log record being indicative of the first write statement to the signal table; and using said log record being indicative of the write statement to the signal table as the start load signal.

* * * * *